(12) United States Patent
Garro et al.

(10) Patent No.: US 7,161,017 B2
(45) Date of Patent: Jan. 9, 2007

(54) METHOD FOR FRACTIONATING GREASE TRAP WASTE AND USES OF FRACTIONS THEREFROM

(75) Inventors: Juan Miguel Garro, Sherbrooke (CA); Alain Lemieux, Thetford Mines (CA); Paul Jollez, Sherbrooke (CA); Nicole Cadoret, Thetford Mines (CA)

(73) Assignee: Prolab Technologies Inc., Quebec (CA)

( * ) Notice: Subject to any disclaimer, the term of this patent is extended or adjusted under 35 U.S.C. 154(b) by 41 days.

(21) Appl. No.: 10/493,959

(22) PCT Filed: Nov. 1, 2002

(86) PCT No.: PCT/CA02/01684

§ 371 (c)(1),
(2), (4) Date: Dec. 15, 2004

(87) PCT Pub. No.: WO03/038020

PCT Pub. Date: May 8, 2003

(65) Prior Publication Data

US 2005/0085653 A1   Apr. 21, 2005

(30) Foreign Application Priority Data

Nov. 1, 2001   (CA) ................................ 2360986

(51) Int. Cl.
*C11B 3/00*   (2006.01)
(52) U.S. Cl. .................................... 554/205
(58) Field of Classification Search ................ 554/205
See application file for complete search history.

(56) References Cited

U.S. PATENT DOCUMENTS 2,421,157 A    5/1947  Myers et al.
2,450,235 A    9/1948  Gee
2,838,480 A    6/1958  Swern
3,755,389 A    8/1973  Blaney
4,097,507 A    6/1978  Person
4,529,551 A    7/1985  Cleary et al.
4,601,856 A    7/1986  Suzuki et al.
5,145,563 A    9/1992  Culbreth et al.
5,194,640 A    3/1993  Cosgrove et al.
5,308,365 A    5/1994  Kesling, Jr. et al.
5,413,634 A    5/1995  Shawl et al.
5,424,467 A    6/1995  Bam et al.
5,476,971 A   12/1995  Gupta
5,525,126 A    6/1996  Basu et al.
6,015,440 A    1/2000  Noureddini

OTHER PUBLICATIONS

Haraldsson, G. "Separation of Saturated / Unsaturated Fatty Acids" JAOCS, vol. 61, No. 2; Feb. 1984, pp. 219-222.
Graboski, M. S. et al, "Combustion of Fat and Vegetable Oil Derived Fuels in Diesel Engines" Prog. Energy combust. Sci. vol. 24 pp. 125-164, 1998.

*Primary Examiner*—Deborah D. Carr
(74) *Attorney, Agent, or Firm*—McDermitt Will & Emery LLP

(57) ABSTRACT

A process for producing unsaturated and saturated free fatty acid from trap oils, trap greases, brown greases and grease trap waste as starting material. The process consist in subjecting the starting material to a pretreatment, a first purification step, a fractional step, a second purification step and eventually a hydrogenation step. Methyl esters of unsaturated and saturated free fatty acids, oleic acid and stearin is obtained from this process.

14 Claims, 2 Drawing Sheets

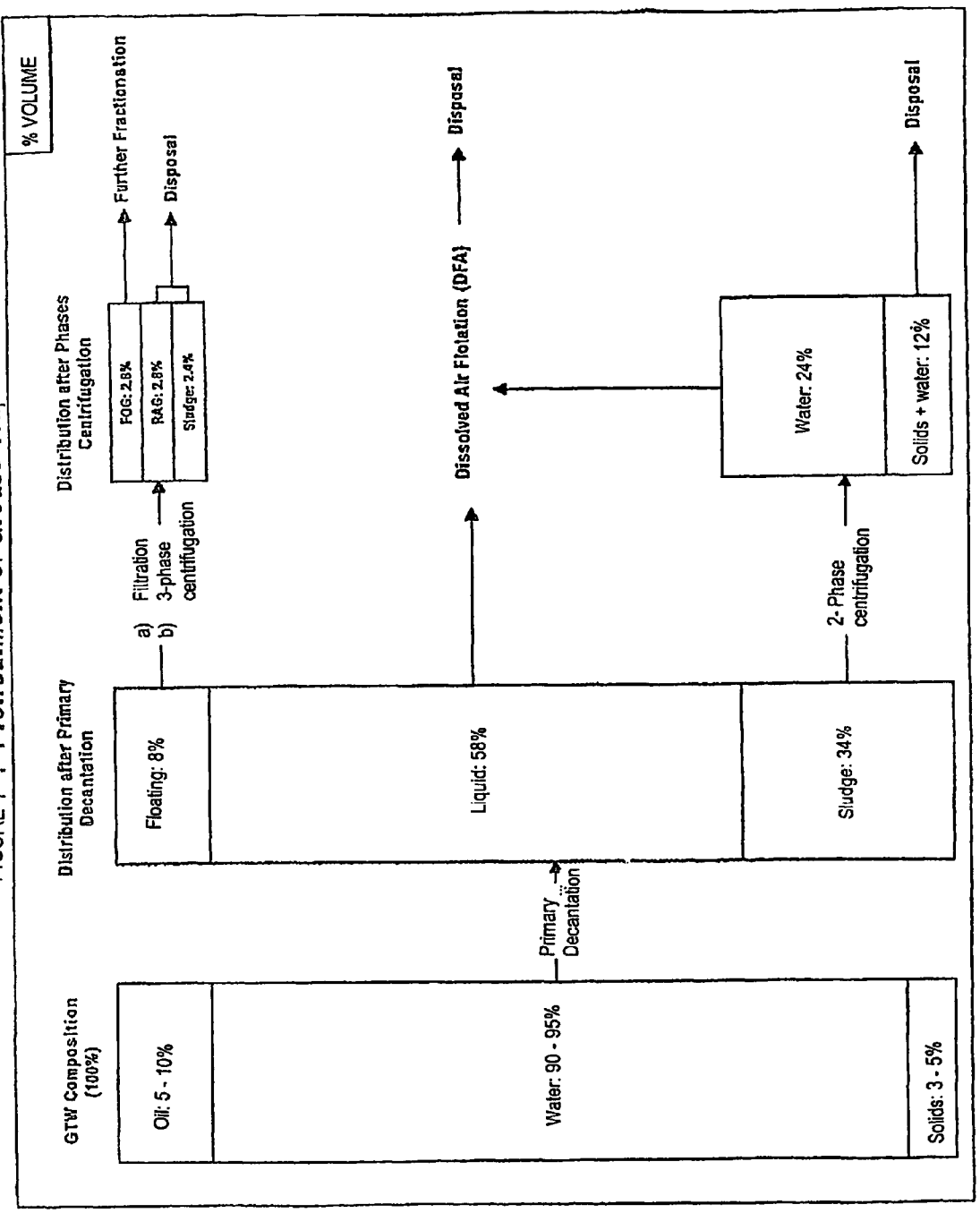
FIGURE 1 : Pretreatment of Grease Trap Waste

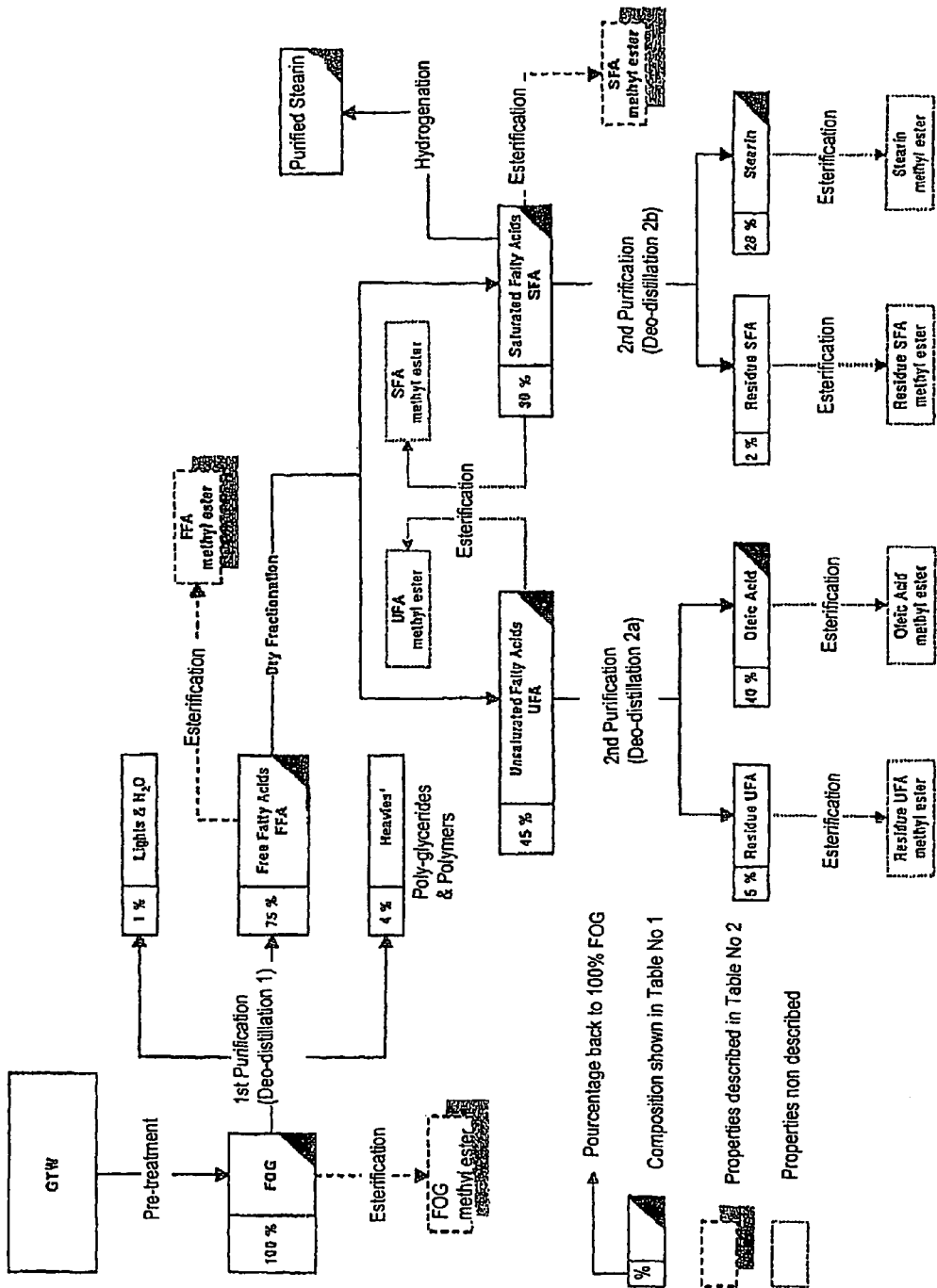
FIGURE 2 : Fractionation of Floating Oils and Greases (FOG)

METHOD FOR FRACTIONATING GREASE TRAP WASTE AND USES OF FRACTIONS THEREFROM

FIELD OF THE INVENTION

The present invention relates to the recycling of residual oils, fats and greases as biofuels, in biodiesel formulations and other oleochemical applications.

BACKGROUND OF THE INVENTION

Most commercial unsaturated acids (i.e. oleic acid) are derived from animal tallow (by-product of the meat industry), tall oil (by-product of paper mills) or natural vegetable oils.

Fat splitting processes are well known in the art. The most common methods are:
1) Twichell process;
2) Batch autoclave process;
3) Continuous process; and
4) Enzymatic process.

In Twichell process, the fat is hydrolyzed at a temperature of 100° C. to 105° C. and at atmospheric pressure for 12 to 48 hours. Alkyl-aryl acid or cycloaliphatic sulfonic acid with sulfuric acid (0.75–1.25% w/w) are used as catalysts. Yields of 85%–95% are obtained. The main inconvenients resulting from this process are the catalyst handling, long reaction time, tendency to form dark-colored acid and high labor cost.

In the batch autoclave operations, the fat is hydrolyzed in the presence or absence of a catalyst. Live steam is injected continuously at the bottom while venting a small amount thereof to maintain the desired agitation and operating pressure. After settling and formation of an aqueous and a fatty acid phase, the fatty acid phase is treated with mineral acid. The fatty acid phase is further washed with water to remove traces of the mineral acid. Under catalytic conditions (i.e. zinc, calcium or magnesium oxides) the fatty acid phase is reacted for a period of 5 to 10 hours at 150° C.–175° C. A high yield of about 85%–95% is obtained. Without catalyst the fatty acids phase is reacted for a period of 2 to 4 hours at a high temperature (240° C.) to give similar yields. The main inconvenients resulting from this process are the catalyst handling and high labor cost.

In continuous operations also known as the Colgate-Emery process, a single-stage countercurrent high pressure splitting is carried out for fat hydrolysis. The fat is introduced by means of a sparge ring from the bottom of the splitting tower while water is introduced by the top. The crude fat passes as a coherent phase from the bottom to the top, while heavier splitting water travels downward as a dispersed phase through the mixture of fat and fatty acids. The high temperatures involved (250° C.–260° C.) associated to high pressures (725 psi) assures degrees of splitting up to 98% in only 2 to 3 hours. The principal inconvenients of this process are the high cost associated with the equipment and the restriction to relative clean starting materials.

In enzymatic operations, the lipase from *Candida rugosa*, *Aspergillus niger*, and *Rhizopus arrhizus* had been studied at temperatures of 26° C. to 46° C. for periods of 48 to 72 hours. Even though 98% of splitting is claimed there is no commercial process available until now. The principal inconvenient of this process is that because enzymes work very well over a specific substrate under specific conditions. Therefor, when the starting material is composed of more than one product, the reaction is less selective. Long reaction times and great volumes required to satisfy the optimal concentration are also current problems involved in this kind of procedure.

Fractionation of free fatty acids is commonly performed by distillation of tall oil. Tall oil is recovered in most paper mills by acidulation of the soap skimming from black liquor. Crude tall oil (CTO) consists of a mixture of fatty acids (40%–45%), resin acid (40%–45%) and various neutral components (i.e. hydrocarbons, wax alcohols, sterols, esters and residues). About 40% to 50% of the fatty acids contained in tall oil are oleic acid, while another 35% to 45% are linoleic acid. Higher quality of tall oil fatty acids, TOFA, (less than 2% of resins acid) can be obtained by distillation through two columns: a rosin column and a fatty acids column.

Oleic acid is probably the most important unsaturated fatty acids (UFA) because many applications have been developed for its use in different fields (i.e. cosmetics, chemicals, lubricants, textiles, etc.). Separation of oleic acid form tall oil distillates requires additional refining steps. Best known-process for fractionation of fatty acids by crystallization from solvent is the "Emersol" process, developed by Emery Industries Inc. in 1934. Different American patents used different solvents (methanol: U.S. Pat. No. 2,421,157; acetone: U.S. Pat. No. 2,450,235 and methyl formate: U.S. Pat. No. 3,755,389) to separate saturated fatty acids from unsaturated fatty acids. The process was optimized by addition of crystallizing promoters (neutral fats, tallow, and glycerol tri-stearate). One more refined promoter is described in Australian patent AU-28434/92. It is the reaction product of: 1) a polyhydric alcohol (i.e. glycerol, pentaerythritol, trimethylol pentane, etc.), 2) a dicarboxylic acid (i.e. adipic, oxalic, succinic, azelaic, glutaric and tartaric) and 3) a fatty acid.

All these processes require explosion proof installations and low temperature refrigeration systems.

Other methods for producing oleic acid involve separation over molecular sieves (U.S. Pat. Nos. 4,529,551 and 4,529,551); lithium soap separation (U.S. Pat. No. 4,097,507), urea complexation (U.S. Pat. Nos. 2,838,480 and 4,601,856) and complexation with dienophiles (U.S. Pat. No. 5,194,640). All these process have the inconvenient of a high cost operation associated to the use of chemicals required.

Dry fractionation technology was originally developed for treatment of animal fat (i.e. beef tallow) in the 60's. Since this time, many improvements were performed in response to the ever-increasing demand of the industry for new products with very specific requirements. Two main sources are now the target of this technology: 1) vegetable oils such as palm oil, soybean oil, sunflower oil, rapeseed oil, groundnuts oil, cottonseed oil and palm kernel oil and 2) animal fats such as beef tallow, milk fat, lard and fish oil.

These fats and oils are mainly composed of triglycerides, diglycerides and monoglycerides (i.e. a broad range of melting points) constituting a large number of intersoluble glycerides that are very difficult to separate by dry fractionation (i.e. solvent free crystallization). The separation of a liquid fraction (i.e. olein, used in food oil) and a solid fraction (i.e. stearin, used in shortening and margarine) can be achieved through dry fractionation.

In the present invention, dry fractionation was used to separate purified free fatty acid obtained by splitting the residual oils and greases recuperated from industrial and commercial operations (i.e. trap greases, yellow greases and brown greases).

The free fatty acids obtained from these starting materials are mainly constituted by unsaturated fatty acids, such as mainly oleic acid, linoleic acid, linolenic acid and saturated fatty acids such as palmitic acid and stearic acid. The range of melting points for these limited numbers of products, in comparison with all the possible combinations presented by glycerides, was shown to be wide enough to perform a highly selective separation.

Vegetable oils (i.e. triglycerides) were the first fuels used in diesel engines. They were subsequently abandoned because of major problems associated with their use (i.e. injector fouling, ring sticking and varnish build-up on the cylinder walls). As it is known, these problems are the result of high viscosity and high reactivity of polyunsaturated fatty acids present in triglycerides.

More efficient and economical petroleum-based fuels rapidly shifted these vegetable oils fuels. Today fuels are composed of mixtures of hydrocarbons derived from mineral oils. However, it is well known that exhaust gases from internal combustion of mineral fuels ($CO$, $NO_x$, $SO_x$, etc.) are shown to be very polluting. Moreover, in view of the limited mineral oil reserves and their increasing cost, there is a demand for renewable fuels that could replace petrol hydrocarbons or would permit the existing resources to be more effectively used.

Since the introduction of vegetable oil fuels (i.e. biodiesel) in the forties, much work has proceeded to increase its viability as a fuel substitute. In recent years, there has been a considerable amount of research worldwide on alternative diesel fuels. Biodiesel research programs, based on vegetable oils, are centered in eliminating the former problems (high viscosity and reactivity), the quality of emission, waste minimization and cost.

Viscosity problems were overcome by a drastic reduction of the molecular weight of branched triglycerides into linear monoesters more similar to straight hydrocarbons in regular diesel. The procedure of conversion involves a transesterification reaction with an alcohol. This reaction is preferably carried out in excess of alcohol (i.e. methanol or ethanol) and in the presence of a catalyst (i.e. sodium or potassium hydroxide). The products from the reaction are:

a) esters of vegetable oil;
b) glycerin;
c) alcohol (non-reacted excess) and
d) residual and spent catalyst.

At the end of the reaction, products are separated in two phases: an upper non-polar ester rich phase and a lower polar glycerin phase. The non-reacted alcohol and the residual and spent catalyst are distributed between the ester and glycerin phases. Moreover, some low molecular weight esters are dissolved in the glycerin phase. As each one contaminates both phases, many attempts to improve phase's separation have been developed.

Low glycerin content in biofuels is required to avoid clogs of the injection nozzles during combustion. Austria has been the first country to set a national biodiesel standard with maximum glycerin content (0.24% total and 0.02% free). Actually these values are recognized in many countries including the American National Biodiesel Board (NBB).

In the case of biodiesel fuel obtained from soy oil, 20% of crude glycerol is produced as a by-product and that represents a major effluent problem. The market for very high purity glycerol is limited and it requires very expensive purification. To overcome effluent problems, development projects were focused on different uses of the glycerol phase.

U.S. Pat. No. 5,145,563 (Culbreth et al., 1992) describes the use of ethers of glycerol as extractive distillation agent.

U.S. Pat. No. 5,308,365 (Kesling et al., 1994) describes the use of glycerol ethers mixed with biodiesel fuels to improve emissions content.

U.S. Pat. No. 5,476,971 (Gupta, 1995) describes reacting pure glycerol with isobutylene in the presence of an acid catalyst in a two phases reaction to produce mono-, di- and tri-tertiary butyl ethers of glycerol.

U.S. Pat. No. 5,413,634 (Shawl et al., 1995) describes use of ethers of glycerol as an additive to enhance physical properties of cement.

U.S. Pat. No. 5,424,467 (Bam et al., 1997) described the use of glycerol as a solvent for washing the ester phase to carry out the excess of methanol and the catalyst.

U.S. Pat. No. 6,015,440 (Noureddini, 2000) describes the elimination of the glycerin phase by converting it to ether derivatives by reacting glycerol with isobutylene in order to obtain only one phase (alcohol esters & glycerol ethers).

All these attempts to improve glycerol elimination and/or valorization require additional costly steps. It is quite evident that even in view of known prior art, the presence of glycerol as a by-product of the transesterification of triglycerides present in oils continues to be a problem.

Many of the problems related to the presence of glycerol could be overcome by utilizing other starting material other than vegetable oils (i.e. triglycerides).

Free fatty acids (FFA) obtained by fractionation of residual oils and greases recovered from industrial and commercial operations (i.e. grease trap waste: GTW) could be successfully used in the production of the aforementioned biodiesel. However such products may exert a strong odor during its processing.

SUMMARY OF THE INVENTION

An object of the present invention is to provide an industrial application of residual oils, fats and greases.

Another object of the present invention is to provide a process for the production of Free Fatty Acids (FFA), from residual oils and greases recuperated from industrial and commercial operations (i.e. grease trap waste: GTW) that overcomes most of the above-mentioned problems.

A further object of the present invention is to provide a process for the production of Unsaturated Fatty Acids (UFA), from residual oils and greases recuperated from industrial and commercial operations (i.e. grease trap waste: GTW).

A further object of the present invention is to provide a process for the production of Residue UFA, from residual oils and greases recuperated from industrial and commercial operations (i.e. grease trap waste: GTW).

A further object of the present invention is to provide a process for the production of Oleic Acid, from residual oils and greases recuperated from industrial and commercial operations (i.e. grease trap waste: GTW).

A further object of the present invention is to provide a process for the production of Saturated Fatty Acids (SFA), from residual oils and greases recuperated from industrial and commercial operations (i.e. grease trap waste: GTW).

A further object of the present invention is to provide a process for the production of Residue SFA, from residual oils and greases recuperated from industrial and commercial operations (i.e. grease trap waste: GTW).

A further object of the present invention is to provide a process for the production of Stearin, from residual oils and greases recuperated from industrial and commercial operations (i.e. grease trap waste: GTW).

A further object of the present invention is to provide a process for the production of Purified stearin, from residual oils and greases recuperated from industrial and commercial operations (i.e. grease trap waste: GTW).

A further object of the present invention is to provide a process for the production of biodiesel from residual oils and greases recuperated from industrial and commercial operations (i.e. grease trap waste: GTW).

More precisely, the process for producing unsaturated and saturated free fatty acids, according to the present invention is characterized in that it comprises the steps of:

a) selecting a starting material from the group consisting of trap oils, trap greases, brown greases, and grease trap waste;

b) pretreating the oils and/or greases selected in step a) in order to separate the oils and/or greases from water and obtain a mixture of saturated, unsaturated free fatty acids and impurities;

c) subjecting the mixture obtained in step b) to a first purification step by fractionating the mixture obtained in step b) in three fractions: a light fraction principally constituted of volatile compounds and water, an intermediate fraction mainly constituted of free fatty acids, and a residual heavy fraction mainly constituted of poly-glycerides and polymers;

d) fractionating the free fatty acids fraction in two fractions: saturated fatty acids (SFA) and unsaturated fatty acids (UFA); and e) subjecting the saturated fatty acids and unsaturated fatty acids to a second purification step in order to obtain oleic acid and stearin and their respective unsaturated and saturated fatty acid residues.

The present invention is also concerned with the use of trap oils, trap greases, brown greases, and/or grease trap waste for the production of biodiesel, solvents and additives for diesel fuel.

The present invention will be better understood upon reading the following non-restrictive detailed description.

DETAILED DESCRIPTION OF THE INVENTION

In the process according to the present invention, residual oils, fats and greases, referred herein as Grease Trap Waste (GTW) constitute the starting material to be treated. The GTW derives from post-consumers and/or by-products of industrial and commercial operations.

Compared to yellow greases (YG) which are recuperated in special containers inside restaurants and food industries (i.e. no other contact with water than that of the food moisture), grease trap waste (GTW) are generally collected in the traps installed on the sewage water outlet of restaurants and food industries. These traps allow the collection of the oils and greases carried over with the wastewater of washing operations, before they reach the municipal sewage network. In the traps, the greases are normally subjected to a natural enzymatic hydrolysis. The glycerin is then washed by the wastewater liberating most of the free fatty acids of the original triglycerides. As a result of the different feedstock and washing operations, their composition could be very different, but in a good approximation, they are mainly constituted of a mixture of floating oils and greases (5–10%), water (90–95%) and residual solids (1 to 3%) (see FIG. No. 1).

At room temperature, grease trap waste (GTW) forms a non-homogeneous unstable emulsion. They have a strong odor characteristic of acetic and/or butyric fermentation (i.e. fermentation of olives before oil extraction). The grease trap waste (GTW) may be pretreated by decantation, filtration and centrifugation. Canadian patent applications No. 2,307,450 filed on May 2, 2000 and No. 2,310,992 filed on Jun. 8, 2000 described methods for suitably pre-treating GTW according to the present invention.

Pretreatment of residual oils, fats and greases is a very important step to obtain a lipidic starting material that can be esterified into methyl esters and used as biodiesel. Moreover, the present application describes methods that could be used for the methyl esterification of different fractionated products (i.e. FOG, FFA, residue UFA, Oleic acid, residue SFA, Stearin and Purified Stearin: see FIG. 2). Examples for FOG, FFA and SFA are shown.

Generally, the first step in the treatment of GTW is a primary room temperature decantation in which grease trap waste (GTW) are separated in three layers (floating, liquid and sludge). A typical example of a mass balance following this operation is as below:

| Input | | Output | |
|---|---|---|---|
| GTW | 100% | Top: Floating | 8% V |
|  |  | Middle: Liquid | 58% V |
|  |  | Bottom: Sludge | 34% V |

The bottom layer (34%), generally named "sludge layer", is mainly constituted of water and solids, and it is subsequently separated in two phases by centrifugation. By this operation, a water phase (⅔ V) can be removed from a residual concentrated sludge (⅓ V) (see FIG. No. 1).

The middle layer (58% V) as well as the water phase coming from the sludge layer separation (⅔ V) are then treated in a Dissolved Air Flotation unit before being disposed in the municipal sewage network (see FIG. 1).

The top layer (8%), named "floating layer", is hot filtered at about 60° C. to about 95° C. in order to eliminate any suspended solids. This operation may be carried out with a rotary screen filter set up to remove particles greater than 500 μm. After filtration, a three-phase centrifugation is performed and generally give the following material balance:

| Input | | Output | |
|---|---|---|---|
| Floating | 100% V | Top: FOG | 35% V |
|  |  | Middle: RAG | 35% V |
|  |  | Bottom: Sludge | 30% V |

The middle layer (RAG: oil, water & solids) and the bottom layer (Sludge: solids & water) are disposed under strict municipal requirements (see FIG. No. 1).

The top layer, named FOG, is essentially free of water and it is constituted of a mixture of free fatty acids, tri, di, and monoglycerides, trimer & dimer acids, oxidized monomers (light fraction), unsaponifiables and other colored long chain oxidized products. A typical composition of FOG is presented in Table 1.

Once the FOG has been obtained it can be used as such for the preparation of esters (i.e. FOG methyl ester) or it can be further fractionated. See FIG. 2 for different fractions and yields.

A first purification step or deodorizing step is intended to remove: lights fraction (i.e. volatile compounds responsible for strong odor) & water (if any) and heavy fraction (i.e. colored material principally composed of poly-glycerides, polymers and their products of oxidative decomposition). This separation can be performed with different distillation techniques (i.e. falling film evaporation, wiped film evaporation, fractional distillation and molecular distillation).

One particular option is a deodorization which consists of steam stripping followed by a distillation which is carried out at a temperature ranging from 150° to 200° C. and at a pressure varying from 2 to 3 mbar (Deo-distillation) of FOG. As shown hereinafter in Example 2, we described the conditions used for this first purification. Typical composition of free fatty acids (FFA) obtained is described in Table No. 1.

Further fractionation can be done to split the free fatty acids fraction (FFA) in free unsaturated (UFA) and free saturated (SFA) fatty acids. Suitable fractionation methods includes:

a) By quenching free fatty acids fraction (FFA) oil in a solvent at low temperatures. Solvent may be selected from the group consisting of hexane, acetone, isopropyl alcohol and ethanol. Temperature range is about −5° C. to about −20° C. Unsaturated fatty acids (UFA) are dissolved in the solvent while saturated fatty acids (SFA) precipitate under these conditions. Filtration can be easily performed in a filter press, a Sparkler filter, a centrifuge or similar equipment.

b) By crystallization of saturated fatty acids (SFA), present in the free fatty acids fraction (FFA), using a detergent that coats the crystals, then increasing their specific weight.

c) By dry fractionation, based on the differences between the melting points of saturated (SFA) and unsaturated (UFA) free fatty acids. The principal advantages of this technology are that there is no solvent requirement and temperature range is higher than in previous cases (i.e. over zero degrees). Crystallization is normally carried out by a detailed program of cooling (i.e. precision of 0.1° C.). It is important to note that unsaturated fatty acids (UFA) and saturated fatty acids (SFA) are mutual contaminants. Poor filtration lets important quantities of UFA in SFA reducing the yield of UFA and decreasing the purity of SFA. This problem can be successfully overcome by using a filter press under pressure. Pressure is generated by squeezing the membrane, which wraps the filter cloth. A refrigerated liquid or gas can generate the pressure in order to keep the right temperature of crystallization. Pressures can vary from 10 bars to 30 bars.

Typical composition of unsaturated free fatty acids (UFA) and saturated free fatty acids (SFA) obtained under dry fractionation are presented in Table No. 1. As shown, the unsaturated fatty acid fraction (UFA), is composed of about 87.7% of oleic acid, linoleic acid and linolenic acids whereas the saturated fatty acids (SFA) fraction, is composed of 65.9% of saturated fatty acids. The UFA and the SFA fractions obtained from GTW thus have a very interesting commercial value.

A second purification step is intended to get reduced color and odor in the respective fractions. This separation can also be performed with different distillation techniques (i.e. falling film evaporation, wiped film evaporation, fractional distillation and molecular distillation). In a preferred embodiment, this purification step may be carried out by combining a deodorization step which consists of steam stripping followed by a distillation step carried out at a temperature varying from 150 to 200° C. and at a pressure varying from 2 to 3 mbar (Deo-distillation). As shown hereinafter in Example 4, we described the conditions used for this second purification.

Typical composition of oleic acid and stearin obtained is described in Table No. 1. Total unsaturated fatty acids raised to 91.7% in Oleic acid fraction and total saturated fatty acids in Stearin fraction (62.5%) remain close to the values of SFA (65.9%).

Hydrogenation of saturated fatty acids (SFA) results in the production of purified stearin mainly constituted by palmitic (45%) and stearic (51%) acids. As shown in Example 6, the hydrogenation conditions are described. Typical composition of the hydrogenated stearin is described in Table No. 1.

Methyl esterification of different products of fractionation: floating oils and greases (FOG), free fatty acids (FFA) and saturated fatty acids (SFA) are described in Examples 7, 8, and 9. Characterization of the products obtained is presented in Table No. 2.

The following examples are illustrative of the wide range of applicability of the present invention and are not intended to limit its scope. Modifications and variations can be made therein without departing from the spirit and scope of the invention. Although any methods and materials similar or equivalent to those described herein can be used in the practice for testing of the present invention, the preferred methods and materials are described.

EXAMPLE 1

Pretreatment of GTW.

10 metric tons of Grease Trap Waste (GTW) coming from the food industry of the Boston metropolitan area was decanted in tank at room temperature for 48 h. The upper floating layer (800 L) was separated and heated to 90° C. until a very fluid solution was obtained. This solution was hot filtered in a UNI-FRAME™ rotary screen to eliminate particles greater than 500 μm. The filtered solution was centrifuged in a 3-phase centrifuge to obtain 280 L of a floating oil and greases (FOG) fraction. Composition of FOG is presented in Table No. 1.

EXAMPLE 2

First Purification (Deo-Distillation) of FOG.

10 Kg of FOG are deodorized and distilled following the process conditions described herein:

| 1st Purification | Température (C.) | Pressure (mbar) | Time (min) | Steam injection (%) |
|---|---|---|---|---|
| Deodorization | 150 | 2 | 60 | 1.5 |
| Distillation | 200 | 3 | 30 | 0.5 |

At the end of deodorization the product is not cooled but immediately distilled.

Yields for each fraction (i.e. lights, FFA and heavies) are shown in FIG. 2. Characterization of FFA is presented in Table No. 1.

EXAMPLE 3

Dry Fractionation of FFA.

Free fatty acids (FFA) are heated to 60° C. until complete dissolution. A detailed program of nine cooling steps follows. The crystallization conditions were:

| Cooling Step | Température (C.) Initial | Température (C.) Final | ΔT | Step Time (min) | Cooling Speed (C./min) | Cumulative Time (min) |
|---|---|---|---|---|---|---|
| 1 | 60 | 60 | 0 | 60 | 0 | 60 |
| 2 | 60 | 40 | 20 | 20 | 1 | 80 |
| 3 | 40 | 40 | 0 | 40 | 0 | 120 |
| 4 | 40 | 20 | 20 | 40 | 0.5 | 160 |
| 5 | 20 | 20 | 0 | 20 | 0 | 180 |
| 6 | 20 | 10 | 10 | 40 | 0.25 | 220 |
| 7 | 10 | 10 | 0 | 80 | 0 | 300 |
| 8 | 10 | 5 | 5 | 10 | 0.5 | 310 |
| 9 | 5 | 5 | 0 | 65 | 0 | 375 |

The filter is pre-cooled to the same temperature of filtration (i.e. 5° C.) and this temperature maintained all over the filtration time. Yields for each fraction, Unsaturated Fatty Acids (UFA) and Saturated Fatty Acids (SFA), are shown in FIG. 2. Characterization of them is presented in Table No. 1.

EXAMPLE 4

Second Purification (Deo-Distillation 2a) of UFA.

Unsaturated fatty acids coming from the dry fractionation are deodorized and distilled following the process conditions described herein:

| 2$^{nd}$ Purification | Température (C.) | Pressure (mbar) | Time (min) | Steam injection (%) |
|---|---|---|---|---|
| Deodorization | 150 | 3 | 60 | 2 |
| Distillation | 200 | 3 | 45 | 0.5 |

At the end of deodorization the product is not cooled but immediately distilled. Yields for each fraction, Oleic acid and residue UFA, are shown in FIG. 2. Characterization of Oleic acid fraction is presented in Table No. 1.

EXAMPLE 5

Second Purification (Deo-Distillation 2b) of SFA.

Saturated fatty acids coming from the dry fractionation are deodorized and distilled following the process conditions described herein:

| 2$^{nd}$ Purification | Température (C.) | Pressure (mbar) | Time (min) | Steam injection (%) |
|---|---|---|---|---|
| Deodorization | 150 | 3 | 60 | 2 |
| Distillation | 200 | 3 | 45 | 0.5 |

At the end of deodorization the product is not cooled but immediately distilled. Yields for each fraction, Stearin and residue SFA, are shown in FIG. 2. Characterization of Oleic acid fraction is presented in Table No. 1.

EXAMPLE 6

Hydrogenation of Saturated Fatty Acids (SFA) Fraction.

The saturated fatty acids (SFA) fraction obtained after dry fractionation is hydrogenated in a Parr reactor at 20 bar of hydrogen pressure during 2 hours at 205° C. The catalyst (22% Nickel) was used at 0.2% (WAN SFA basis). After hydrogenation, the catalyst was filtered and the product obtained was deo-distilled in the same way of the second purification previously described. Characterization of Purified stearin is presented in Table No. 1.

EXAMPLE 7

Esterification of FOG

5 Kg of a FOG (acid value=168 mg KOH/g) were reacted with 3374 g of methanol at reflux temperature in presence of 75 g of an acidic catalyst. After a 20 hour reaction, two phases were clearly observed. The bottom one corresponds to methyl esters and the top one to methanol. Three washings with hot water (2.5 L each) were performed over 1 minute with very slow stirring of the ester phase. Anhydrous $Na_2SO_4$ (25% w) was added to the organic phase to remove residual water. After drying (30 min) the acid number was 3.3 mg KOH/g. In order to further reduce the acid number, $Al_2O_3$ (20% w) was added and the temperature increased to 140° C. After 20 minutes, filtration was performed and the acid number was reduced to 0.4 mg KOH/g. The yield for esterification reaction is more than 75% and the full characterization of the product obtained is presented in Table No. 2.

EXAMPLE 8

Esterification of Free Fatty Acids Fraction (FFA).

5 Kg of a free fatty acids fraction (FFA) with an acid number of 181 mg KOH/g were reacted with 3374 g of methanol at reflux temperature in presence of 75 g of an acidic catalyst. After a 20-hour reaction, two phases were clearly observed. The bottom one corresponds to methyl esters and the top one to methanol. Three washings with hot water (2.5 L each) were performed over 1 minute with very slow stirring of the ester phase. Anhydrous $Na_2SO_4$ (25% w) was added to the organic phase to remove residual water. After drying (30 min) the acid number was 3.5 mg KOH/g. In order to further reduce the acid number, $Al_2O_3$ (20% w) was added and the temperature increased to 140° C. After 20 minutes, filtration was performed and the acid number was reduced to 0.5 mg KOH/g. The yield for esterification reaction was more than 80% and the full characterization of the product obtained is presented in Table No. 2.

EXAMPLE 9

Esterification of the Saturated Fatty Acid (SFA) Fraction.

A saturated fatty acid (SFA) fraction was esterified using substantially the same procedure described in Examples 7 and 8. The yield for esterification reaction was more than 80% and the full characterization of the product obtained is presented in Table No. 2.

The fractions used as examples for esterification (FOG, FFA, and SFA) don't limit the use of the others fractions (UFA, Residue UFA, Oleic Acid, Residue SFA, Stearin or Purified stearin) that could also be obtained by using the same method of the present invention.

Esterification was performed with an excess of the stoechiometric quantity of methanol. The reaction was carried-out at reflux temperature in presence of an acidic catalyst (i.e. HCl, $H_2SO_4$, $H_3PO_4$, p-toluenesulfonic acids or some acidic resins) during a period varying between 10 h to 40 h, more preferable between 10 h and 20 h.

Different analysis were performed on the products obtained by external laboratories specialized in diesel fuels. The results are summarized in Table No. 2.

Distillation (ASTM D86): The distillation range is used to determine the calculated cetane index.

Cetane Calculated Index (ASTM D976): It is based on specific gravity and the 10, 50 and 90% distillation temperatures to give numbers that correlate with the cetane engine test method.

Cloud Point (ASTM D2500): Is the temperature at which a cloud of crystals first appears in a liquid when cooled under determined conditions. Three cooling baths ($T_1=-1°$ C. to $-3°$ C.; $T_2=-15°$ C. to $-18°$ C. and $T_3=-30°$ C. were used. Thermometer was completely immersed into the sample.

Pour Point (ASTM D97): Is an index of the lowest temperature at which it has utility in certain applications. Only the bulb of the thermometer was immersed into the sample.

From the results obtained, it is clear that the present invention provides a new and useful industrial application of residual oils, fats and greases. Indeed, unsaturated fatty acids and saturated fatty acids of commercial value were obtained from GTW. Furthermore, characterization of the methyl esters obtained satisfy the requirements of the U.S. National Biodiesel Board (NBB) and are very closed to those of commercial products (i.e. GRIFFIN BIO G300™) confirming the potentiality of the various fractions obtained as biofuels.

While several embodiments of the invention have been described, it will be understood that the present invention is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention.

TABLE 1

Properties and compositions for products obtained at different stages of the process of the present invention.

| Properties | Analytical Method | #C: #= | 1st Purification Deo-Distilliation 1 | | Dry Fractionation | | 2nd Purification: Deo-Distalliation 2 | | Hydrogeration of stearin |
|---|---|---|---|---|---|---|---|---|---|
| | | | FOG | FFA | Unsaturated Fatty Acids (UFA) | Saturated Fatty Acids (SFA) | Oleic Acid | Stearin | Purified Stearin |
| Acid Value (mg KOH/g) | Ca 5a-40 | | 179.00 | 200.00 | 190.00 | 207.00 | 191.00 | 202.00 | 208.00 |
| Titer (C) | Cc 12-59 | | 81.50 | 83.90 | 8.20 | | 3.50 | 47.50 | 65.10 |
| Iodine Value (% $I_2$) | Cd 1-25 | | 73.70 | 78.80 | 104.00 | 36.50 | 99.90 | 96.10 | 0.23 |
| Saponification Value (mg KOH/g) | Cd 3-25 | | 203.00 | 109.60 | 185.20 | | 202.00 | 205.00 | 211.00 |
| Unsaponflables (%) | Ca 5a-40 | | 1.38 | 0.58 | 0.71 | | 0.88 | 0.05 | 0.15 |
| Peroxide Value (meq/kg) | Cd 8-53 | | 24.70 | 2.00 | 9.80 | | 2.00 | 17.00 | 1.00 |
| Lovibond $5_{1/4}$ Yellow | Cc 13b-45 | | N.A. | 41* | 38* | | 14.00 | 4.00 | 1.00 |
| (*$2_{3/4}$) Red | | | N.A. | 5.7* | 9.7* | | 2.10 | 1.10 | 0.10 |
| Composition (%) | GC | | | | | | | | |
| Caprilic Acid | | 8:0 | | | 0.10 | | | | |
| Capric Acid | | 10:0 | | | 0.20 | | | | |
| Lauric Acid | | 12:0 | <0.1 | <0.1 | 0.20 | | <0.1 | | |
| Myristic Acid | | 14:0 | 0.80 | 1.20 | 1.20 | 1.60 | 0.80 | 1.20 | 1.30 |
| Palmitic Acid | | 16:0 | 18.10 | 19.70 | 3.80 | 40.60 | 4.00 | 42.20 | 45.00 |
| Margaric Acid | | 17:0 | 0.1 | 0.20 | 0.10 | 0.70 | <0.1 | 0.60 | 0.90 |
| Stearic Acid | | 18:0 | 5.20 | 6.80 | <0.1 | 18.00 | <0.1 | 18.40 | 51.00 |
| Myriafoleic Acid | | 14:1 | <0.1 | <0.1 | 0.20 | | 0.20 | | |
| Palmitoleic Acid | | 18:1 | 2.00 | 2.30 | 3.00 | 1.00 | 3.10 | 1.00 | |
| Oleic Acid | | 18:1c | 42.60 | 47.60 | 62.70 | 23.30 | 68.00 | 24.00 | |
| Linoleic Acid | | 18:2c | 11.40 | 12.70 | 18.20 | 5.20 | 18.80 | 5.70 | |
| Linoienic Acid | | 18:3c | 2.30 | 2.50 | 3.60 | 1.10 | 3.80 | 1.00 | |
| Others | | | 1.00 | 1.00 | 1.30 | 0.40 | 1.10 | 0.40 | 1.00 |
| Total FFA (%) | | | 81.60 | 83.80 | 84.60 | 96.90 | 97.70 | 94.60 | 99.20 |
| Total Unsaturated (UFA) (%) | | | 58.30 | 65.10 | 67.70 | 30.60 | 91.70 | 81.70 | 0.00 |
| Total Saturated (SFA) (%) | | | 22.30 | 27.70 | 5.60 | 85.90 | 4.80 | 62.90 | 88.20 |
| Ratio UFA/SFA | | | 2.61 | 2.35 | 15.68 | 0.46 | 18.71 | 0.50 | 0.00 |

TABLE 2

Caracterisation of Biodieseis

| PROPERTY | ANALYTICAL METHOD | LIMITS[1] | Griffin[2] Bio G300 | FOG | FFA | SFA |
|---|---|---|---|---|---|---|
| Color Transmitance: | ASTM D1500 | | 5.5 | 7.5 | 8.0 | |
| 440 nm | | | 1.2 | 0.0 | 0.0 | |

TABLE 2-continued

Caracterisation of Biodieseis

| PROPERTY | ANALYTICAL METHOD | LIMITS[1] | Griffin[2] Bio G300 | FOG | FFA | SFA |
|---|---|---|---|---|---|---|
| 550 nm | | | | 41.5 | 5.4 | 6.7 |
| Kinematic Viscosity, 40° C. (cst) | ASTM D445 | 1.9–6.0 | 4.86 | 5.2 | 5.4 | 5.2 |
| Pour Point (° C.) | ASTM D97 | | | 6 | 3 | |
| Cloud Point (° C.) | ASTM D2500 | Report to consumer | 5 | 8 | 6 | |
| Acide Number (mg KOH/g) | ASTM D664 | 0.80 max | 0.36 | 0.40 | 0.50 | 0.57 |
| Volumetric Mass @ 15° C. (Kg/m$^3$) | ASTM D4052 | | | 881.6 | 883.5 | 878.6 |
| API Density | | | | 29.0 | 28.6 | 29.6 |
| Flash Point (° C.) | ASTM D92 | 100.0 min | 160 | 182 | 188 | 184 |
| Fire Point (° C.) | ASTM D92 | | | 194 | 196 | 194 |
| Sulfur (%) | ASTM D4294 | 0.05 max | | 0.0155 | 0.0200 | 0.0138 |
| Water & Sediments (%) | ASTM D1795 | 0.050 max | 0.02 | 0.010 | 0.025 | 0.017 |
| Copper Strip Corrosion | ASTM D130 | 3 max | 1A | 1B | 1A | 1A |
| Sulfated Ash (%) | ASTM D874 | 0.020 max | 0.005 | 0.08 | 0.07 | 0.007 |
| Cetane Ccalculated Index | ASTM D976 | 40 min | 53 | 47.8 | 47.3 | 48.4 |
| Distillation: | ASTM D86 | | | | | |
| Initial Point (° C.) | | | | 306.5 | 308.5 | 295.5 |
| 10% recuperation (° C.) | | | | 325.5 | 326.0 | 322.5 |
| 50% recuperation (° C.) | | | | 334.5 | 335.0 | 331.0 |
| 90% recuperation (° C.) | | | | 356.5 | 360.5 | 353.0 |
| Cracking (° C.) | | | | 368.0 | 371.0 | 362.5 |
| Recuperation (%) | | | | 98.0 | 98.0 | |
| Carbon residue (%) | ASTM D524 | 0.050 max | 0.032 | 0.10 | 0.12 | 0.41 |
| Calorilic Value (BTU/lb) | ASTM D240 | | | 17145 | 17269 | 16457 |
| Free Glycerine (%) | GC | 0.020 max | 0.01 | 0.005 | 0.023 | 0.021 |
| Total Glycerin (%) | GC | 0.240 max | 0.064 | | | |

[1]U.S. National Biodiesel Board
[2]Griffin Industries

The invention claimed is:

1. A process for producing unsaturated and saturated free fatty acids, the process comprising the steps of:
    a) selecting a starting material from the group consisting of trap oils, trap greases, brown greases, and grease trap waste;
    b) pretreating the oils and/or greases selected in step a) in order to separate the oils and/or greases from water and obtain a mixture of saturated, unsaturated free fatty acids and impurities;
    c) subjecting the mixture obtained in step b) to a first purification step by fractionating the mixture obtained in step b) in three fractions: a light fraction principally constituted of volatile compounds and water, an intermediate fraction mainly constituted of free fatty acids, and a residual heavy fraction mainly constituted of poly-glycerides and polymers;
    d) fractionating the free fatty acids fraction in two fractions: saturated fatty acids (SFA) and unsaturated fatty acids (UFA); and
    e) subjecting the saturated fatty acids and unsaturated fatty acids to a second purification step in order to obtain oleic acid and stearin and their respective unsaturated and saturated fatty acid residues.

2. The process according to claim 1, wherein the saturated fatty acids fraction obtained from d), is subjected to a hydrogenation to obtain a purified stearin.

3. The process according to claim 1, wherein the mixture of step b) is subjected to a methyl esterification to obtain FOG methyl ester.

4. The process according to claim 1, wherein the intermediate fraction of step c) is subjected to a methyl esterification to obtain FFA methyl ester.

5. The process according to claim 1, wherein the unsaturated free fatty acids of step d) are subjected to a methyl esterification to obtain UFA methyl ester.

6. The process according to claim 1, wherein the saturated free fatty acids of step d) are subjected to a methyl esterification to obtain SFA methyl ester.

7. The process according to claim 1, wherein the oleic acid, stearin and their respective unsaturated and saturated residues obtained in step e), are subjected to a methyl esterification to obtain oleic acid methyl ester, stearin methyl ester, UFA methyl ester residue and SFA methyl ester residue.

8. The process according to claim 1, wherein the first purification step c) is carried out by distillation techniques.

9. The process according to claim 8, wherein the distillation techniques comprise fractional distillation consisting in a preliminary steam stripping followed by a distillation at a temperature varying from 150° to 200° C. and at a pressure varying from 2 to 3 mbar.

10. The process of claim 1, wherein in that the fractionation step d) is carried out by a detailed cooling temperature program to dry fractionate the saturated fatty acids from the unsaturated fatty acids.

11. The process according to claim 1, wherein the second purification step e) is carried out by distillation techniques.

12. The process according to claim 11, wherein the distillation techniques comprise fractional distillation consisting in a preliminary steam stripping followed by a distillation at a temperature varying from 150° to 200° C. and at a pressure varying from 2 to 3 mbar.

13. The process according to claim 2, wherein the hydrogenation step is carried out in a Parr reactor at 20 bar of hydrogen pressure during 2 hours at 205° C.

14. The process according to claim 2, wherein the hydrogenation step is followed by a purification step comprising subjecting the stearin to
    a preliminary steam stripping and;
    a distillation at a temperature varying from 150° to 200° C. and at a pressure varying from 2 to 3 mbar.

* * * * *